(12) United States Patent
Glab et al.

(10) Patent No.: US 6,512,972 B1
(45) Date of Patent: Jan. 28, 2003

(54) TORQUE DISTRIBUTION ON FOUR WHEEL DRIVE VEHICLES

(75) Inventors: John Antoni Glab, Riverview, MI (US); Peter James Barrette, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 19 days.

(21) Appl. No.: 10/063,825

(22) Filed: May 16, 2002

(51) Int. Cl.[7] .................................................. G06F 7/70
(52) U.S. Cl. ......................................... 701/69; 180/245
(58) Field of Search .............................. 701/69, 74, 75; 180/197, 245, 246, 233, 248, 249

(56) References Cited

U.S. PATENT DOCUMENTS

| | | | | |
|---|---|---|---|---|
| 5,752,211 A | * | 5/1998 | Takasaki et al. ............... | 701/69 |
| 5,839,084 A | * | 11/1998 | Takasaki et al. ............... | 701/69 |
| 5,954,778 A | * | 9/1999 | Rodrigues et al. ............ | 701/69 |
| 5,979,584 A | * | 11/1999 | Gab et al. .................... | 180/248 |
| 6,070,685 A | * | 6/2000 | Takasaki et al. ............ | 180/249 |
| 6,128,565 A | * | 10/2000 | Tsutsui et al. ................. | 701/69 |
| 6,275,762 B1 | * | 8/2001 | Saky ........................... | 701/69 |

FOREIGN PATENT DOCUMENTS

GB    2215893    *  9/1989 .................. 701/69

* cited by examiner

Primary Examiner—Richard M. Camby
(74) Attorney, Agent, or Firm—F. G. McKenzie (57) ABSTRACT

A four wheel drive vehicle, which has an automatic four wheel drive mode, includes a trailer tow detection strategy. If a trailer tow situation is encountered while in automatic four wheel drive mode, then the duty cycle of a clutch in a transfer case can be adjusted to account for the trailer towed behind the vehicle.

20 Claims, 6 Drawing Sheets

| tpo \ Slowest_shaft_speed | 0 kph | 3 | 8 | 16 | 32 | 48 | 64 | 80 | 112+ |
|---|---|---|---|---|---|---|---|---|---|
| 0% | MIN_TOW_THROTTLE Output = 2% for all slow_shaft_speed values | | | | | | | | |
| 10 | 2 | 2 | 2 | 4 | 4 | 6 | 8 | 8 | 10 |
| 20 | 2 | 2 | 2 | 4 | 4 | 4 | 3 | 3 | 3 |
| 30 | 9 | 4 | 4 | 4 | 4 | 4 | 4 | 3 | 3 |
| 40 | 22 | 20 | 18 | 16 | 14 | 12 | 9 | 4 | 4 |
| 50 | 36 | 36 | 34 | 32 | 30 | 28 | 18 | 16 | 12 |
| 60 | 48 | 48 | 48 | 46 | 44 | 42 | 40 | 30 | 20 |
| 70 | 60 | 58 | 58 | 56 | 54 | 54 | 52 | 50 | 48 |
| 80 | 70 | 68 | 68 | 66 | 64 | 64 | 64 | 62 | 60 |
| 97 | MAX_TOW_THROTTLE Output = 80% for all slow_shaft_speed values | | | | | | | | |

TORQUE DISTRIBUTION ON FOUR WHEEL DRIVE VEHICLES

BACKGROUND OF INVENTION

The present invention relates to four wheel drive vehicles and more particularly to torque distribution on four wheel drive vehicles.

Conventionally, four wheel drive systems where manually switched between two wheel drive and four wheel drive. Recent advances have allowed for the drivetrain of the vehicle itself to operate in two wheel drive mode and recognize when the vehicle requires four wheel drive mode to drive optimally.

For a typical automatic four wheel drive vehicle system, the engine delivers torque to the transmission, which in turn transfers the torque to the transfer case. The transfer case divides the torque between the primary axle and the secondary axle based upon an input from a 4×4 control module. During normal operation, the transfer case transfers torque only to the primary axle, and only divides the torque between the two axles on-demand that is, when the 4×4 control module determines a need to transfer some of the torque to the secondary axle. The 4×4 control module, in general, receives input from sensors that measure the speed of the primary axle relative to the secondary axle, among others, and employs these inputs to determine how much of the torque the transfer case should send to the secondary axle.

While this type of system is adequate for many driving conditions, it does not take into account whether the vehicle is towing a trailer or not. Under certain operating conditions while a vehicle is towing a trailer, it is advantageous to transfer additional torque to the secondary axle in order to reduce the overall load on the primary axle.

Thus, it is desirable to have an automatic four wheel drive system that can automatically adjust the torque distribution in order to operate optimally whether the vehicle is towing a trailer or not.

SUMMARY OF INVENTION

In its embodiments, the present invention contemplates a vehicle capable of adjusting a four wheel drive system when towing a trailer. The vehicle has an engine, a transmission operatively engaging the engine, and a transfer case, operatively engaging the transmission for receiving torque input therefrom, and having a primary torque output and a secondary torque output, and a clutch for selectively splitting the torque input from the transmission between the primary torque output and the secondary torque output. The vehicle also has a primary driveline operatively engaging the primary torque output, and a secondary driveline operatively engaging the secondary torque output. A trailer detector includes means for detecting the four wheel drive system is in a mode which allows for torque adjustment between the primary driveline and the secondary driveline; means for detecting an amount of torque demand; means for detecting the rotational velocity of a component of the primary driveline; means for detecting the rotational velocity of a component of the secondary driveline; means for conducting a plurality of tests to determine if preselected parameters exceed corresponding predetermined thresholds, employing the torque demand, the rotational velocity of the component of the primary driveline and the rotational velocity of the component of the secondary driveline; means for repeating the tests over a predetermined time interval; and means for detecting a trailer tow event if the parameters each exceed the corresponding predetermined threshold over the predetermined time interval.

The present invention further contemplates a vehicle trailer tow method employed with a vehicle having a four wheel drive system with a primary and a secondary driveline, the method comprising the steps of: detecting the four wheel drive system is in a mode which allows for torque adjustment between the primary driveline and the secondary driveline; detecting an amount of torque demand; detecting the rotational velocity of a component of the primary driveline; detecting the rotational velocity of a component of the secondary driveline; conducting a plurality of tests to determine if preselected parameters exceed corresponding predetermined thresholds, employing the torque demand, the rotational velocity of the component of the primary driveline and the rotational velocity of the component of the secondary driveline; repeating the tests over a predetermined time interval; and detecting a trailer tow event if the parameters each exceed the corresponding predetermined threshold over the predetermined time interval.

An advantage of the present invention is that a vehicle with an automatic four wheel drive system can automatically detect when it is towing a trailer and adjust the torque distribution between the axles accordingly. This automatic adjustment allows the secondary axle to assist the primary axle during high torque load events, thus allowing the primary driveline to avoid sustaining one hundred percent of the torque during high load trailer tow events.

Another advantage of the present invention is that by allowing for automatic adjustment of the torque distribution between the primary axle and the secondary axle during trailer towing events, a lower maximum torque specification is required for towing a particular weight of trailer, thus allowing for the use of a lower cost and weight primary axle.

A further advantage of the present invention is that the transmission shift points can be adjusted when a trailer tow situation is detected. Further, the fuel rates for the engine can be adjusted when a trailer tow situation is detected.

DETAILED DESCRIPTION

Figure 1:
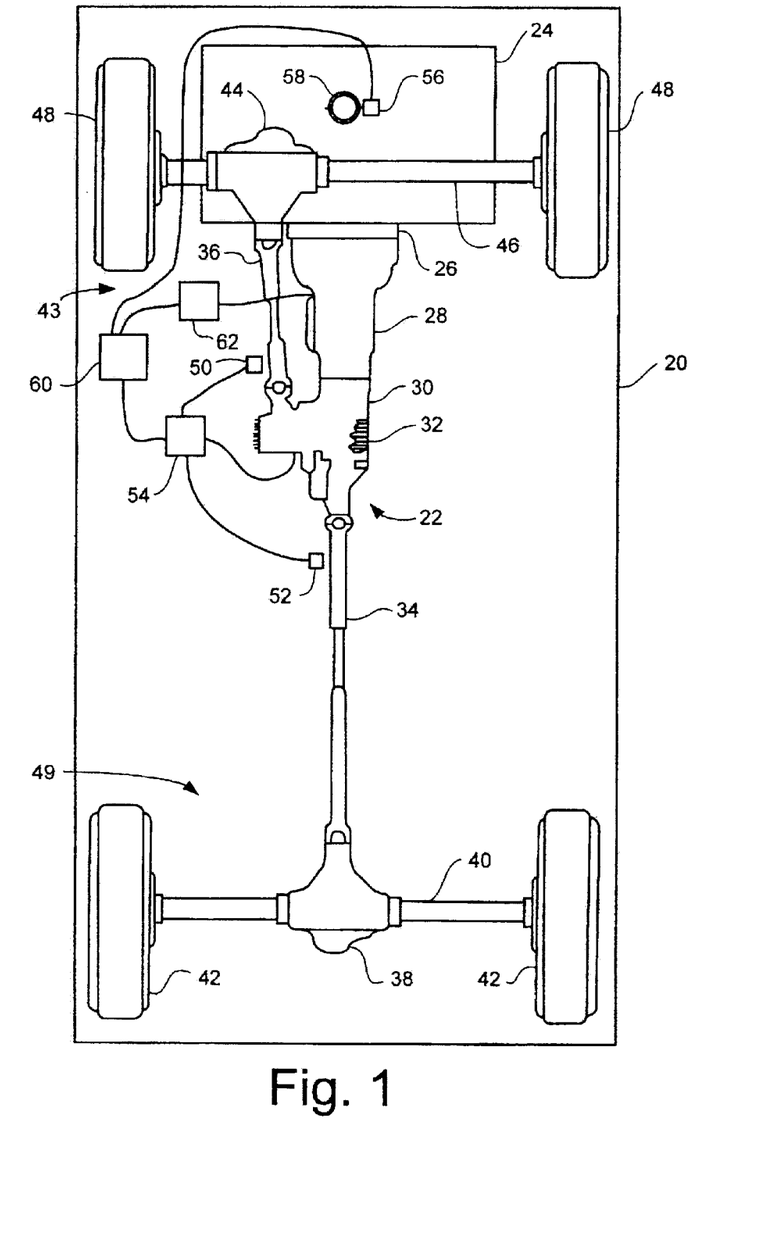
FIG. 1 is a schematic view of a vehicle driveline in accordance with the present invention.

FIG. 1 illustrates a vehicle 20, having a vehicle driveline 22. The vehicle driveline 22 includes an engine 24 engaged with a torque converter 26, which, in turn is engaged with the input of an automatic transmission 28. As an alternative, the torque converter and automatic transmission can be replace with a clutch and manual transmission but this will not be discussed further herein as these components are all conventional and well known in the art. The automatic transmission 28 is engaged with the input of a transfer case 30. The transfer case 30 includes an electromagnetic clutch 32, and is connected to a rear (primary) drive shaft 34 and a front (secondary) drive shaft 36. The rear drive shaft 34 is coupled to a rear differential 38, which is connected to a rear (primary) axle 40, which is, in turn, connected to a corresponding pair of rear wheels and tires 42. These components form a primary driveline 43. The front drive shaft 36 is coupled to a front differential 44, which is connected to a front (secondary) axle 46, which, in turn, is connected to a corresponding pair of front wheels and tires 48. These components form a secondary driveline 49.

A front drive shaft speed sensor 50 is located to sense the rotational speed of the front shaft 36. A rear drive shaft speed sensor 52 is located to sense the rotational speed of the rear shaft 34. The output of the front speed sensor 50 and the rear speed sensor 52 are input to a 4×4 control module 54. Alternatively, a pair of front sensors (not shown), one each associated with a different one of the front wheels 48, can measure the speed of each of the front wheels 48, in which case an average of the two wheel speeds is used instead of the speed of the secondary drive shaft 36. Also, alternatively, a pair of rear sensors (not shown), one each associated with a different one of the rear wheels 42, can measure the speed of each of the rear wheels 42, in which case an average of the two wheel speeds is used instead of the speed of the primary shaft 34. In any event, the speed of the front shaft 36 and the rear shaft 34 can be determined.

The 4×4 control module 54 controls the electromagnetic clutch 32. The transfer case electromagnetic clutch 32 controls the percentage of torque transferred to the front drive shaft 36. If the clutch 32 has a zero percent duty cycle, then all of the torque is transferred to the rear (primary) drive shaft 34. If the clutch 32 has a one hundred percent duty cycle, then half of the torque is transferred to the rear drive shaft 34 and the other half is transferred to the front drive shaft 36. The clutch duty cycle between zero and one hundred percent is generally linear.

A throttle position sensor 56, which is mounted to a throttle body 58 on the engine 24, measures the angle of throttle opening and sends the throttle position output (TPO) signal to a powertrain control module (PCM) 60. The PCM 60 may apply error corrections to the TPO signal before sending the TPO signal to the 4×4 control module 54. The TPO is measured from zero percent, which is the throttle closed position, to one hundred percent, which is full open throttle position. The PCM 60 is also in communication with a transmission control module 62, which controls the operation of the automatic transmission 28.

Figure 2A:
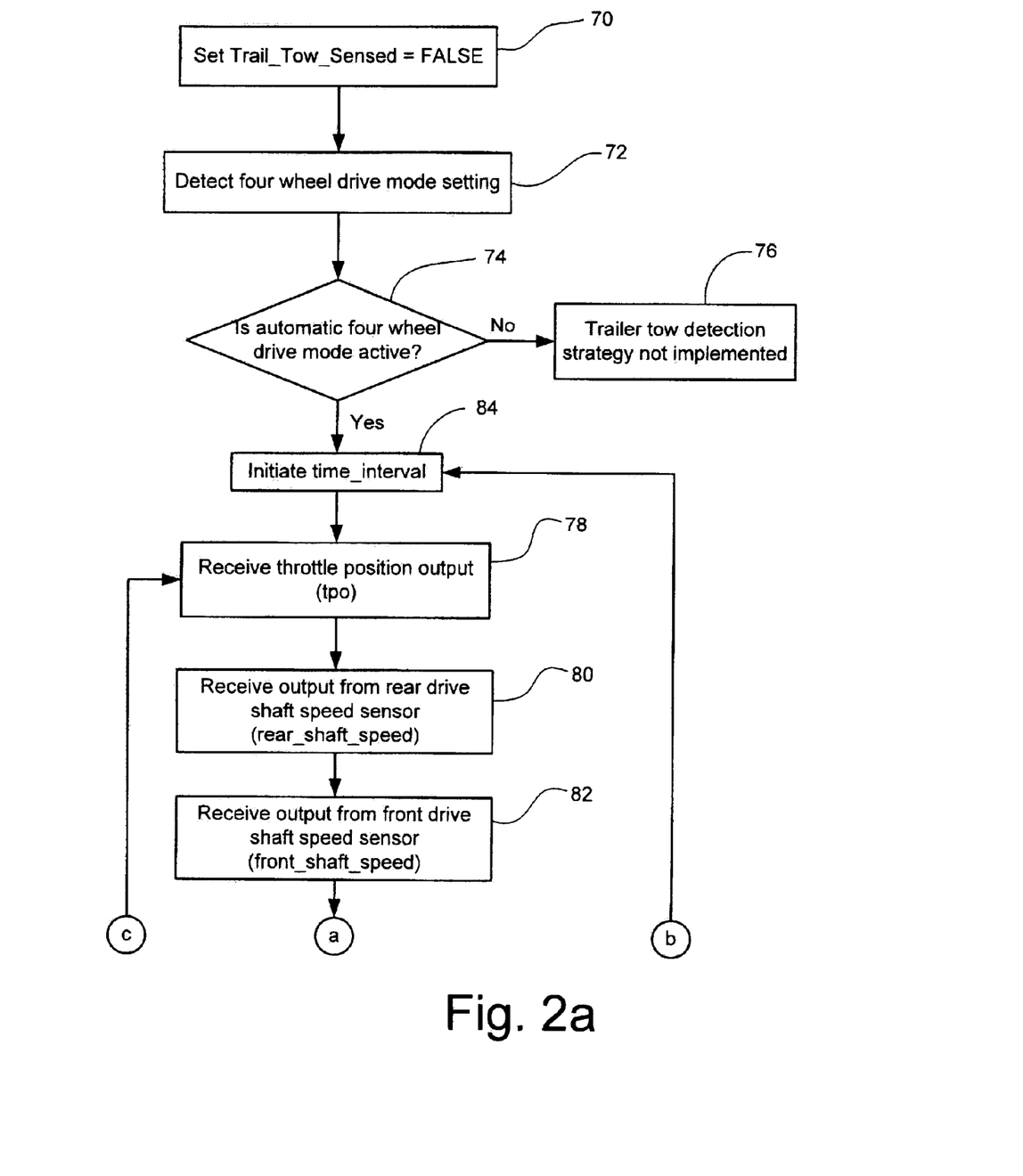
FIG. 2a is a flow chart illustrating a portion of a trailer tow control strategy relating to initialization of the trailer tow strategy and system inputs.

The operation of the trailer tow detection and operating strategy will be discussed with reference to FIGS. 2–4, as they relate to FIG. 1. This strategy can be conducted separate from or in addition to any strategy relating to torque transfer to the secondary driveline 49 due to wheel slippage on the primary driveline 43. The strategy for handling wheel slippage on an all wheel drive drivetrain is known in the art and will not be discussed further herein.

The strategy begins at engine start-up, with initiation of parameters and receiving sensor outputs. Upon ignition cycle of the engine 24 (i.e. engine start-up), the default value of trail_tow_sensed=FALSE is set, step 70. Then the four wheel drive mode is detected, step 72. This mode may be automatic four wheel drive, where the vehicle operates primarily in a two wheel drive mode, but automatically transfers some torque to the secondary driveline 49 if certain operating conditions (e.g. wheel slip on the primary driveline 43) are encountered. This mode may also be full time four wheel drive high, with both the front and rear drivelines receiving torque from the transfer case. And, this mode may be full time four wheel drive low, for low speed off-road driving, with both drivelines again receiving torque from the transfer case. If the four wheel drive mode is not automatic four wheel drive, step 74, then the trailer tow detection strategy is not implemented further, step 76. If the four wheel drive mode is automatic four wheel drive, step 74, then the 4×4 control module 54 will proceed with the trailer tow detection strategy. The automatic detection of a trailer tow event and the adjustment of the torque between the primary and secondary axles is applicable only during the automatic four wheel drive mode.

A time_interval value for the tests, discussed below, is initiated, step 84. The time interval may be, for example, sixty seconds. The 4×4 control module 54 receives a TPO signal from the PCM 60, step 78. As discussed above, the TPO signal from the PCM 60 may have error corrections applied to it before it is sent to the 4×4 control module 54. The 4×4 control module 54 will also receive output from the rear drive shaft speed sensor 52 and the front drive shaft speed sensor 50, steps 80 and 82. These three inputs will be employed during the next two phases of the strategy determining if the vehicle is towing a trailer and, if a trailer tow is detected, adjusting the duty cycle of the clutch 32 in the transfer case 30 accordingly.

In the next portion of the strategy, the 4×4 control module 54 detects when the vehicle 20 is towing a trailer. There are four tests that are used by the 4×4 control module 54 to determine if the vehicle 20 is towing a trailer. All of the test thresholds must be met continuously over the predetermined time interval in order for a trailer tow event to be detected. This time interval allows for false trailer tow event determinations to be avoided.

The first test determines whether there is a high throttle input (i.e. a high torque request). The current percentage TPO (tpo) is compared to a predetermined minimum threshold TPO (TRAIL_TOW_MIN_TPO), step 86. This threshold, for example, may be about thirty five percent TPO. If the current percentage TPO is not greater than the threshold, then the time_interval value is initiated again, step 84. If the current percent TPO is greater than the threshold, then the strategy proceeds to the next test.

The second test determines whether there is little or no vehicle acceleration. The average acceleration (ave_accel) is calculated, step 88. The ave_accel is calculated as 1/n times the sum as i goes from one to n of the loop_time divided into the difference between the slowest_shaft_speed at the current interval (i) minus the slowest_shaft_speed at the previous interval (i−1). The slowest_shaft_speed is equal to the slower of the rear_shaft_speed and the front_shaft_speed, and n and loop_time are predetermined values. For example, n may be five, and loop_time may be twenty milliseconds. After determining the ave_accel, the ave_accel value is then compared to a threshold trailer tow acceleration value (TRAIL_TOW_ACCEL), step 90. The threshold value may be, for example, two kilometers per hour per second (2 k/(h−s)). If the ave_accel is not less than the threshold, then the time_interval value is initiated again, step 84. If the ave_accel is less than the threshold, then the strategy proceeds to the next test.

The third test determines whether there is little or no wheel slip. A measure of wheel slip (yi) is calculate, step 92. The wheel slip is calculate as yi=K*E+Yl, where Yl is the wheel slip calculated in the previous loop. The K value is integral grain, and may be, for example, about eight percent. The E term is the difference between the amount of slip and the allowable slip, E=(D allowance_slip). The allowance_slip term comes from a slip lockup table, and is a function of the rear shaft speed. Also, the difference term D=(rear_shaft_speed front_shaft_speed). If there is no or very little wheel slip, then the yi term will be close to or at a value of zero. After determinig the yi term, it is then compared to a threshold wheel slip value (Yl_TOW_MAX_THRESH), step 94. This threshold may be, for example, a value of fifty percent. If the yi term is not less than the threshold, then the time_interval value is initiated again, step 84. If the yi term is less than the threshold, then the strategy proceeds to the next test.

The fourth test determines whether the vehicle is within a valid speed range for evaluating the trailer tow detection. The slowest shaft speed (slowest_shaft_speed) is employed for this test. The slowest shaft speed is the slower of the rear_shaft_speed and the front_shaft_speed as measured by the rear speed sensor 52 and the front speed sensor 50. The slowest shaft speed is then compared to a lower threshold value (TRAIL_TOW_MIN_SPEED), step 96, and compared to a higher threshold value (TRAIL_TOW_MAX_SPEED), step 98. The lower threshold value may be, for example, fifty six kilometers per hour, and the higher threshold value may be, for example, one hundred twelve kilometers per hour. If the slowest_shaft_speed is not greater than the lower threshold or less than the higher Threshold, then the time_interval value is initiated again, step 84. If the slowest_shaft_speed is greater than the lower threshold and is less than the higher threshold, then the strategy proceeds to determine if the four tests have been met over a sufficient time interval.

If all four tests meet their thresholds, then the amount of time (time_interval) over which the four tests have met their thresholds is compared to a minimum time threshold (TRAIL_TOW_TIME), step 100. This threshold time may be, for example, sixty seconds. If the time interval for the tests is not greater than or equal to the threshold, then the time_interval value is incremented, step 102, and the tests are run again. If the time interval for the tests is greater than or equal to the threshold, then the 4×4 module 54 determines that the vehicle 20 is towing a trailer and the trailer_tow_sensed flag is set to TRUE, step 104, for the remainder of the current ignition cycle.

So long as the trail_tow_sensed flag is set to FALSE, there is no adjustment to account for a trailer being towed by the vehicle. The duty cycle of the clutch 32 in the transfer case 30 (tc_clutch_dc) will be set to some minimum value. For example the duty cycle may be set to about two percent or less. This duty cycle may be adjusted to due other factors (e.g. wheel slip) as discussed above, but such strategies are generally not part of the trailer tow detection and adjustment strategy being discussed herein. Once the trail_tow_sensed flag is set to TRUE, then the strategy proceeds to determine if adjustments should be made to account for the trailer being towed.

When the vehicle is determined to be towing a trailer, then during higher torque demand situations (i.e. higher throttle inputs), the duty cycle of the transfer case clutch 32 is increase in order to increase the torque being sent to the secondary driveline 49. This will relieve some of the stresses on the primary driveline 43. During relatively lower torque demand situations (i.e. lower throttle inputs), the stresses on the primary driveline 43 are lower, so the duty cycle of the transfer case clutch 32 remains low, with most of the torque continuing to be sent to the primary driveline 43. With trail_tow_sensed=TRUE, then, the throttle position output (tpo) is compared to a threshold throttle position value (TRAIL_TOW_THROTTLE), step 106. The threshold value, for example, may be forty percent. If the tpo value is less than the threshold value, then the clutch duty cycle (clutch_dc), for the clutch 32 in the transfer case 30, is set to a low duty cycle value (LOW_DC), step 108. The low duty cycle value may be, for example, four percent. If the tpo value is not less than the threshold value, then the clutch duty cycle (clutch_dc) is set to a high duty cycle value (HIGH_DC), step 110. This high duty cycle value may be, for example, thirty four percent. This way, more of the torque is transferred to the secondary driveline components 49 during higher torque demand periods.

In addition to the duty cycle of the clutch 32 being adjusted when a trailer tow event is detected, other drivetrain adjustments may be made to account for the trailer load on the vehicle 20. While optional and not necessary to implementation of the trailer tow strategy, the other adjustments can improve the overall vehicle performance when towing a trailer. If the trail_tow_sensed flag is set to TRUE, then a signal can be sent from the 4×4 control module 54 to the PCM 60. The PCM 60 forwards the flag to the transmission control module 62, which, in turn, adjusts the shift points of the automatic transmission 28 to account for the extra load of the trailer, step 112. Further, the PCM 60 can adjust the fuel rates for the engine 24, step 114, to account for the trailer load.

Figure 2B:
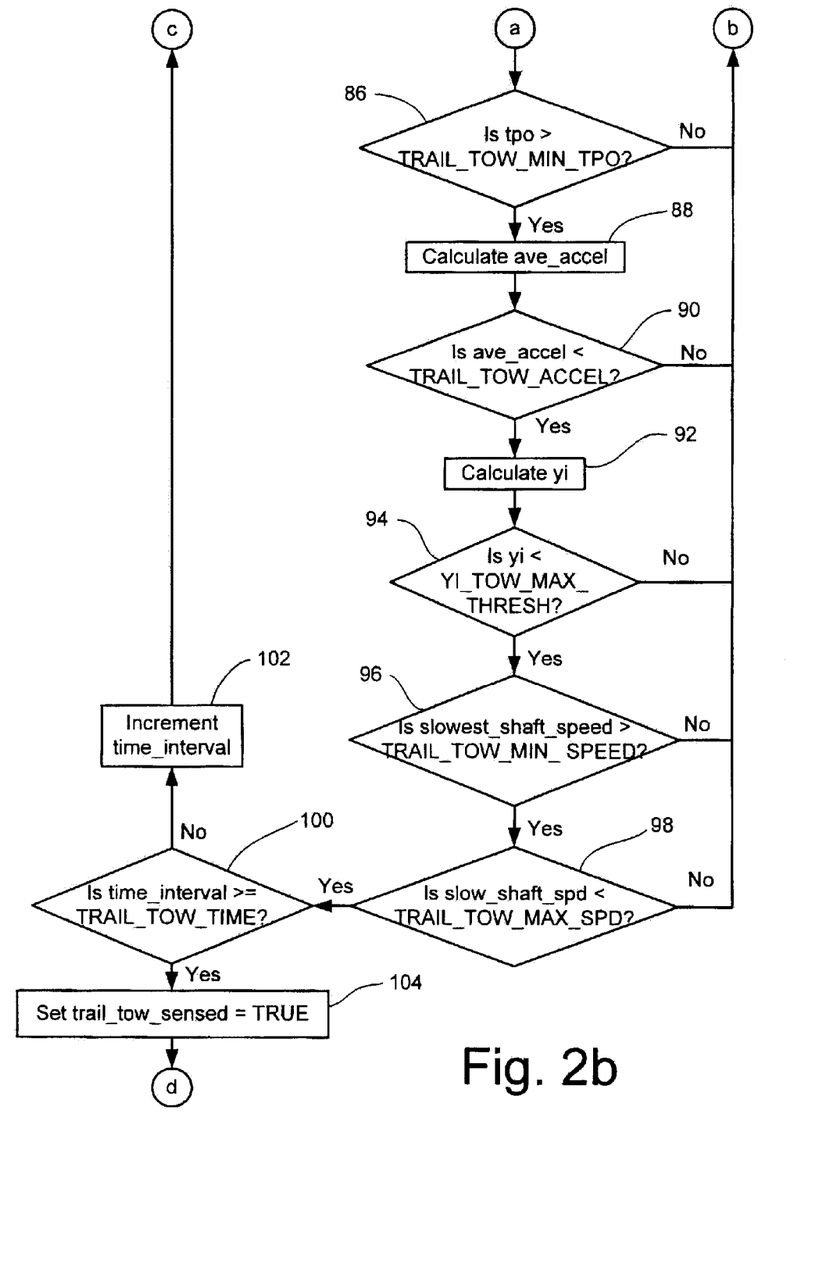
FIG. 2b is a flow chart illustrating a continuation of the flow chart of FIG. 2a relating to tests to determine a trailer tow status.
Figure 2C:
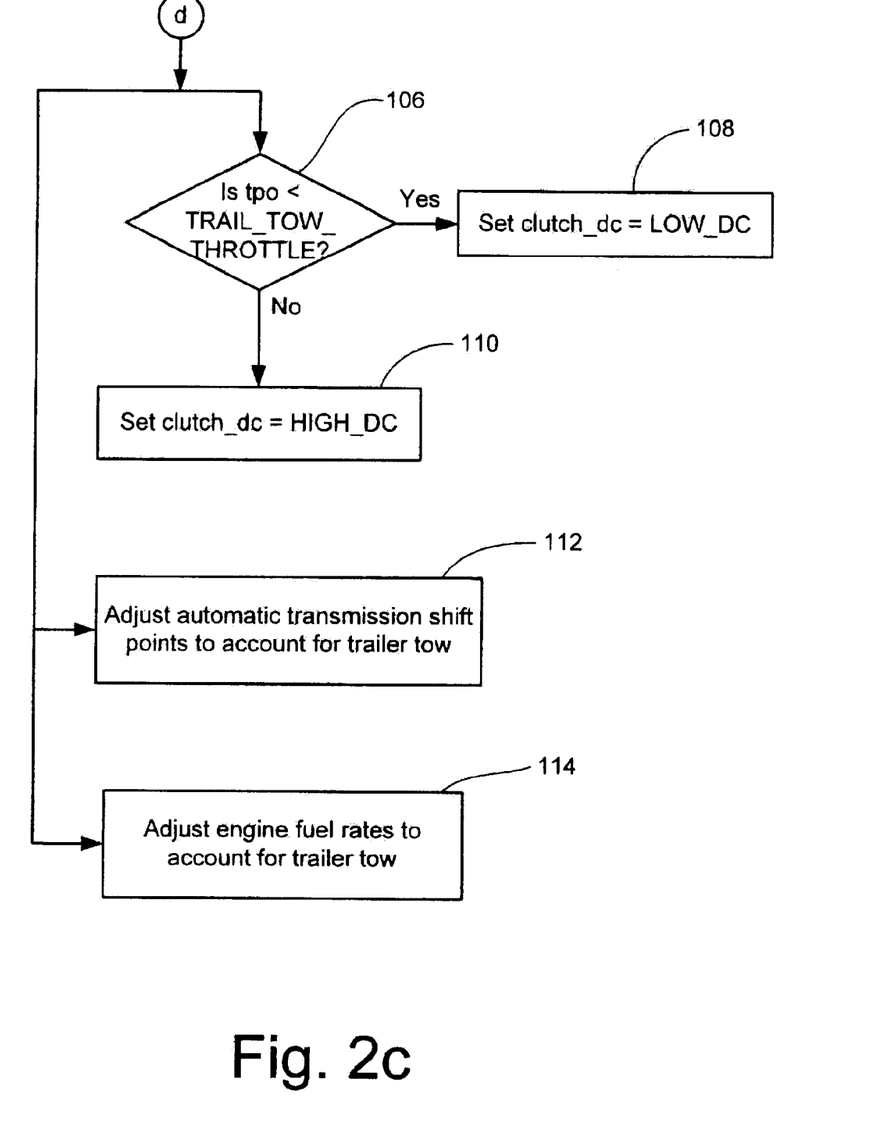
FIG. 2c is a continuation of the flow chart of FIG. 2b relating to system outputs based upon trailer tow status.
Figure 3:
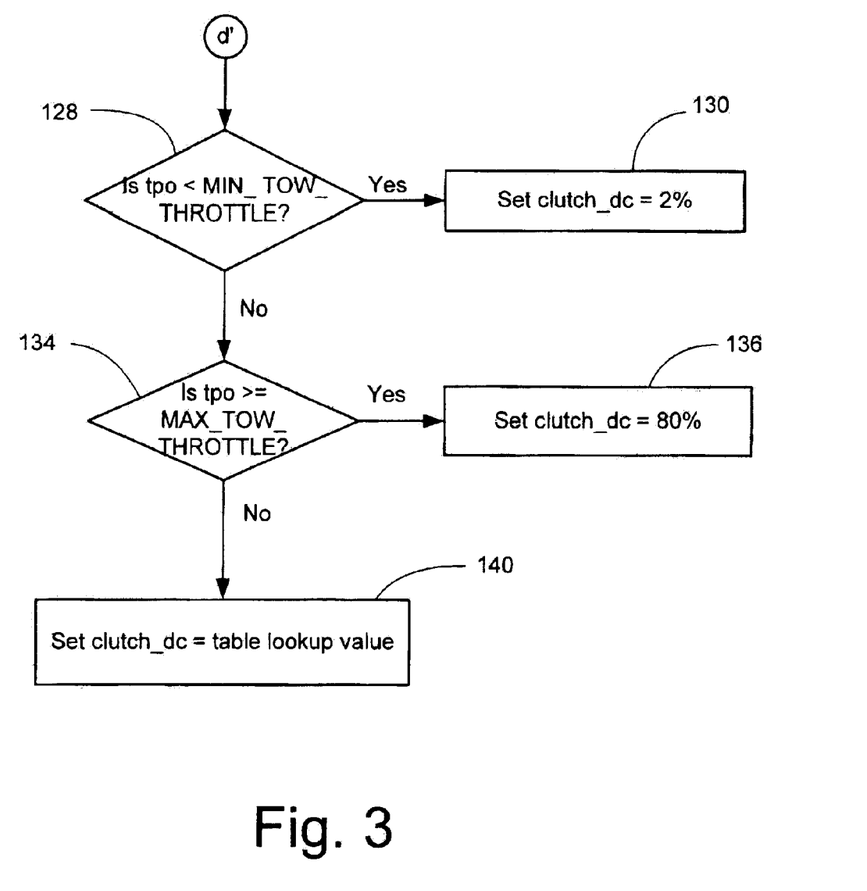
FIG. 3 is a flow chart illustrating an alternate embodiment of FIG. 2c.
Figure 4:
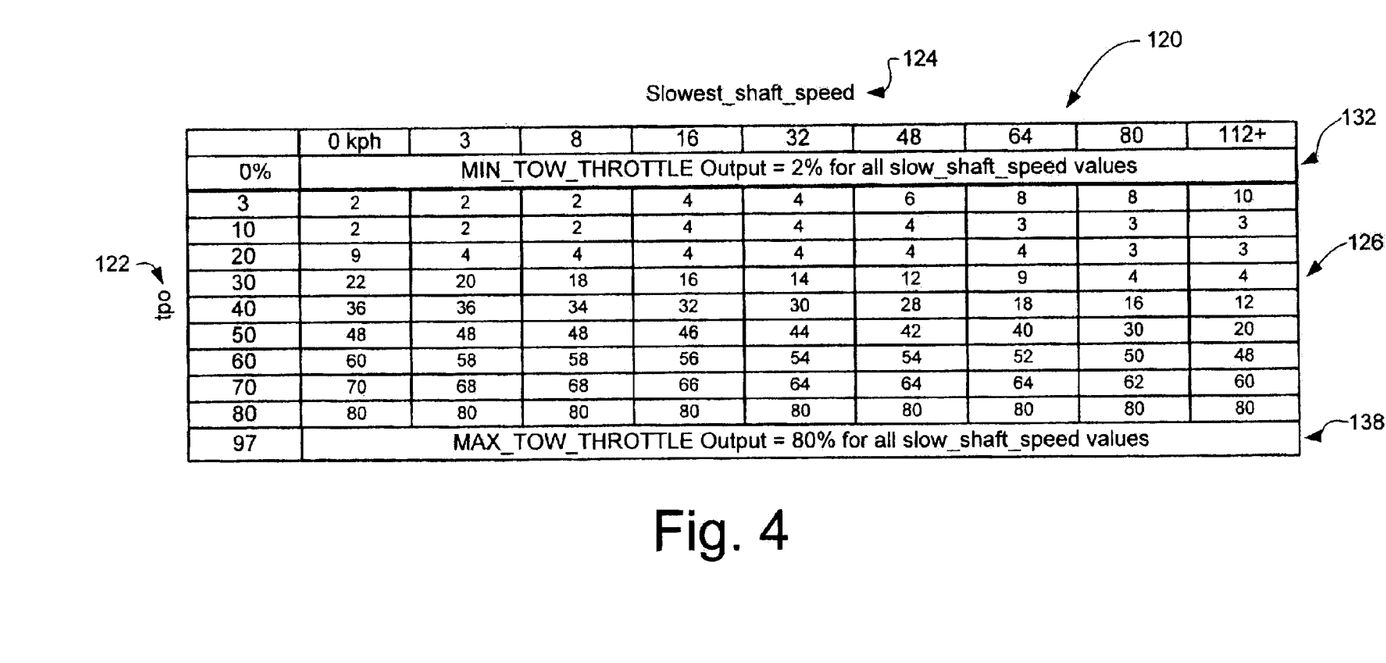
FIG. 4 is a throttle versus speed look-up table in accordance with the alternate embodiment of the invention.

FIGS. 3 and 4 illustrate an alternate embodiment for the adjustment of the clutch duty cycle (clutch_dc) once a determination of a trailer tow event has been detected (i.e. trail_tow_sensed=TRUE), and can replace steps 106, 108 and 110 in FIG. 2c. FIG. 4 illustrates an example of an index table 120 that is stored in the 4×4 control module 54. The table 120 includes throttle plate output (tpo) 122, in percentage open, along one side, and slowest_shaft_speed 124, in kilometers per hour, along the other side. For a given input of tpo 122 and slowest_shaft_speed 124, the table 120 maps to a clutch duty cycle (clutch_dc) output value 126.

FIG. 3 illustrates a flow chart, beginning at "d", which is a continuation of the flow chart from FIG. 2b, after the trail_tow_sensed flag is set to TRUE. The tpo value is compared to a very low threshold tpo value (MIN_TOW_THROTTLE), step 128. During these very low throttle events, where the tpo value is below the threshold, the clutch_dc value is set at a constant duty cycle across all slowest_shaft_speed speed ranges, step 130. In the table of FIG. 4, for example, the clutch_dc is set at two percent 132 when the tpo is less than three percent. If the tpo value is not less than the minimum threshold value, then it is compared to a maximum threshold value (MAX_TOW_THROTTLE), step 134. If a very high throttle event is detected, at or above a maximum threshold, then the clutch duty cycle (clutch_dc) is set at a high constant duty cycle across all slowest_shaft_speed speed ranges, step 136. In the table of FIG. 4, for example, the clutch_dc value is set at eighty percent 138, when the tpo is greater than or equal to eighty percent. Otherwise, the tpo value 122 and the slowest_shaft_speed value 124 are mapped into the table 126 and the clutch_dc value is set at the mapped value for percent duty cycle, step 140. This adjustment of the clutch duty cycle allows for the appropriate shift of torque to the secondary driveline 49, thus reducing the stresses on the primary driveline 43.

Even though the threshold values cited herein are those believe satisfactory for a particular vehicle and drivetrain, they are calibrated values. So, for different vehicle and drivetrain combinations, the threshold values may change in order to provide the optimum results. Consequently, while certain embodiments of the present invention have been described in detail, those familiar with the art to which this invention relates will recognize various alternative designs and embodiments for practicing the invention as defined by the following claims.

What is claimed is:

1. A vehicle trailer tow method employed with a vehicle having a four wheel drive system with a primary and a secondary driveline, the method comprising the steps of:
    detecting the four wheel drive system is in a mode which allows for torque adjustment between the primary driveline and the secondary driveline;
    detecting an amount of torque demand;
    detecting a rotational velocity of a component of the primary driveline;
    detecting a rotational velocity of a component of the secondary driveline;
    conducting a plurality of tests to determine if preselected parameters exceed corresponding predetermined thresholds, employing the torque demand, the rotational velocity of the component of the primary driveline and the rotational velocity of the component of the secondary driveline;
    repeating the tests over a predetermined time interval; and
    detecting a trailer tow event if the parameters each exceed the corresponding predetermined threshold over the predetermined time interval.

2. The method of claim 1 further comprising the step of adjusting the torque between the primary driveline and the secondary driveline if the trailer tow event is detected and the amount of torque demand is above a predetermined trailer tow torque threshold.

3. The method of claim 2 wherein the step of conducting a plurality of tests includes setting a predetermined minimum threshold of torque demand as a preselected parameter; and comparing the detected amount of torque demand to the threshold of torque demand to determine if the detected amount of torque demand exceeds the threshold torque demand.

4. The method of claim 3 wherein the step of conducting a plurality of tests further includes setting a predetermined maximum threshold of acceleration as a preselected parameter; calculating an average acceleration value; and comparing the threshold of acceleration to the average acceleration to determine if the average acceleration is less than the threshold of acceleration.

5. The method of claim 4 wherein the step of conducting a plurality of tests further includes setting a predetermined maximum threshold of wheel slip as a preselected parameter; calculating a wheel slip value; and comparing the threshold of wheel slip to the wheel slip value to determine if the wheel slip value is less than the threshold of wheel slip.

6. The method of claim 5 wherein the step of conducting a plurality of tests further includes setting a predetermined minimum threshold of shaft speed and setting a predetermined maximum threshold of shaft speed as preselected parameters; calculating a slowest shaft speed value; comparing the minimum threshold of shaft speed to the slowest shaft speed value to determine if the slowest shaft speed value is greater than the minimum threshold of shaft speed; and comparing the maximum threshold of shaft speed to the slowest shaft speed value to determine if the slowest shaft speed value is less than the maximum threshold of shaft speed.

7. The method of claim 1 further comprising the steps of: mapping a torque adjustment amount between the primary driveline and the secondary driveline on the basis of the torque demand and the slower of the rotational velocities of the primary driveline component and the secondary driveline component; and adjusting the torque between the primary driveline and the secondary driveline by the mapped torque adjustment if the trailer tow event is detected.

8. The method of claim 1 wherein the step of conducting a plurality of tests includes setting a predetermined minimum threshold of torque demand as a preselected parameter; and comparing the detected amount of torque demand to the threshold of torque demand to determine if the detected amount of torque demand exceeds the threshold torque demand.

9. The method of claim 1 wherein the step of conducting a plurality of tests includes setting a predetermined maximum threshold of acceleration as a preselected parameter; calculating an average acceleration value; and comparing the threshold of acceleration to the average acceleration to determine if the average acceleration is less than the threshold of acceleration.

10. The Method of claim 9 wherein the step of calculating the average acceleration value includes determining an average of a difference in rotational velocity between consecutive time intervals, over a predetermined number of the immediately previous consecutive time intervals.

11. The method of claim 1 wherein the step of conducting a plurality of tests includes setting a predetermined maximum threshold of wheel slip as a preselected parameter; calculating a wheel slip value; and comparing the threshold of wheel slip to the wheel slip value to determine if the wheel slip value is less than the threshold of wheel slip.

12. The method of claim 11 wherein the step of calculating the wheel slip value includes adding a wheel slip value from an immediately previous time interval to an integral gain multiplied by a difference between the rotational velocity of the component of the primary driveline and the rotational velocity of the component of the secondary driveline minus a predetermined allowable slip value.

13. The method of claim 1 wherein the step of conducting a plurality of tests further includes setting a predetermined minimum threshold of shaft speed and setting a predetermined maximum threshold of shaft speed as preselected parameters; calculating a slowest shaft speed value; comparing the minimum threshold of shaft speed to the slowest shaft speed value to determine if the slowest shaft speed value is greater than the minimum threshold of shaft speed; and comparing the maximum threshold of shaft speed to the slowest shaft speed value to determine if the slowest shaft speed value is less than the maximum threshold of shaft speed.

14. The method of claim 1 further including the step of adjusting a set of shift points in a transmission if the trailer tow event is detected.

15. The method of claim 1 further including the step of adjusting fuel rates in an engine if the trailer tow event is detected.

16. A vehicle trailer tow method employed with a vehicle having a four wheel drive system with a primary and a secondary driveline, the method comprising the steps of:
    detecting the four wheel drive system is in a mode which allows for torque adjustment between the primary driveline and the secondary driveline;
    detecting an amount of torque demand;
    detecting a rotational velocity of a component of the primary driveline;

detecting a rotational velocity of a component of the secondary driveline;

conducting a plurality of tests to determine if preselected parameters exceed corresponding predetermined thresholds, employing the torque demand, the rotational velocity of the component of the primary driveline and the rotational velocity of the component of the secondary driveline;

repeating the tests over a predetermined time interval; detecting a trailer tow event if the parameters each exceed the corresponding predetermined threshold over the predetermined time interval; and adjusting the torque between the primary driveline and the secondary driveline if the trailer tow event is detected and the amount of torque demand is above a predetermined trailer tow torque threshold.

17. The method of claim 16 wherein the step of conducting a plurality of tests includes:

setting a predetermined minimum threshold of torque demand as a preselected parameter; and comparing the detected amount of torque demand to the threshold of torque demand to determine if the detected amount of torque demand exceeds the threshold torque demand;

setting a predetermined maximum threshold of acceleration as a preselected parameter; calculating an average acceleration value; and comparing the threshold of acceleration to the average acceleration to determine if the average acceleration is less than the threshold of acceleration;

setting a predetermined maximum threshold of wheel slip as a preselected parameter; calculating a wheel slip value; and comparing the threshold of wheel slip to the wheel slip value to determine if the wheel slip value is less than the threshold of wheel slip; and setting a predetermined minimum threshold of shaft speed and setting a predetermined maximum threshold of shaft speed as preselected parameters; calculating a slowest shaft speed value; comparing the minimum threshold of shaft speed to the slowest shaft speed value to determine if the slowest shaft speed value is greater than the minimum threshold of shaft speed; and comparing the maximum threshold of shaft speed to the slowest shaft speed value to determine if the slowest shaft speed value is less than the maximum threshold of shaft speed.

18. A vehicle capable of adjusting a four wheel drive system when towing a trailer, the vehicle comprising:

an engine;

a transmission operatively engaging the engine;

a transfer case, operatively engaging the transmission for receiving torque input therefrom, and having a primary torque output and a secondary torque output, and a clutch for selectively splitting the torque input from the transmission between the primary torque output and the secondary torque output;

a primary driveline operatively engaging the primary torque output;

a secondary driveline operatively engaging the secondary torque output;

a trailer detector including means for detecting the four wheel drive system is in a mode which allows for torque adjustment between the primary driveline and the secondary driveline; means for detecting an amount of torque demand;

means for detecting the rotational velocity of a component of the primary driveline; means for detecting the rotational velocity of a component of the secondary driveline; means for conducting a plurality of tests to determine if preselected parameters exceed corresponding predetermined thresholds, employing the torque demand, the rotational velocity of the component of the primary driveline and the rotational velocity of the component of the secondary driveline; means for repeating the tests over a predetermined time interval; and means for detecting a trailer tow event if the parameters each exceed the corresponding predetermined threshold over the predetermined time interval.

19. The vehicle of claim 18 further including means for adjusting the torque between the primary driveline and the secondary driveline if the trailer tow event is detected and the amount of torque demand is above a predetermined trailer tow torque threshold.

20. The vehicle of claim 18 further including at least one of means for adjusting a set of shift points in the transmission if the trailer tow event is detected, and means for adjusting fuel rates in the engine if the trailer tow event is detected.

* * * * *